May 25, 1965 H. U. SPENCE 3,185,124
STERN STEERING FOR HYDRAULIC JET BOAT
Filed July 17, 1961 7 Sheets-Sheet 1
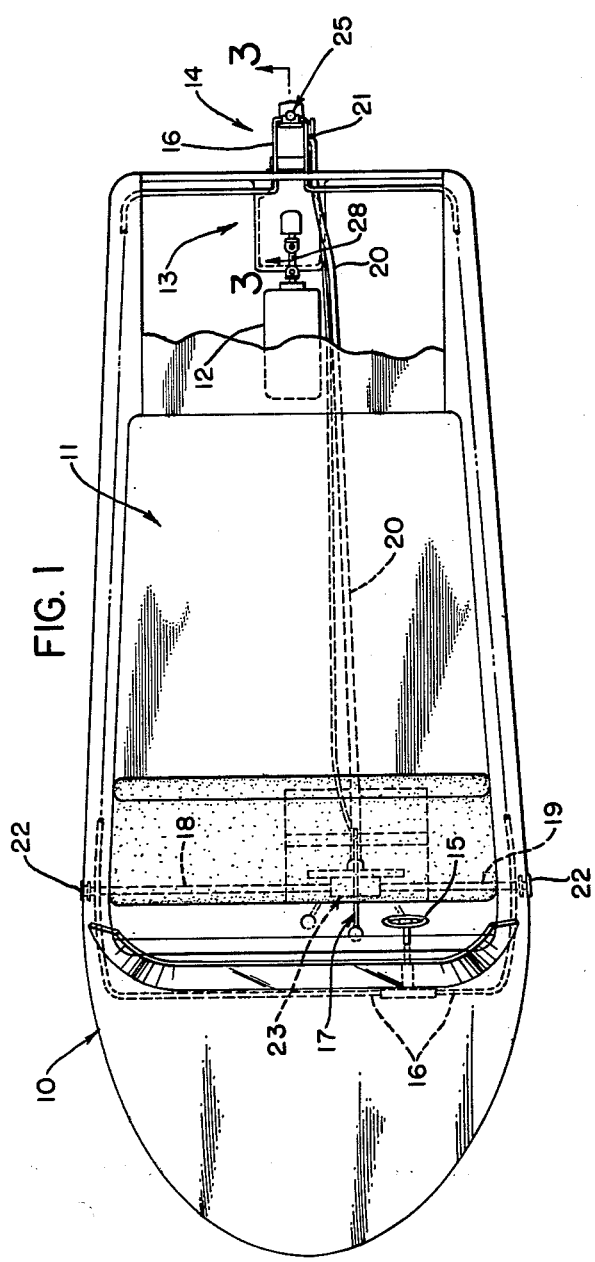
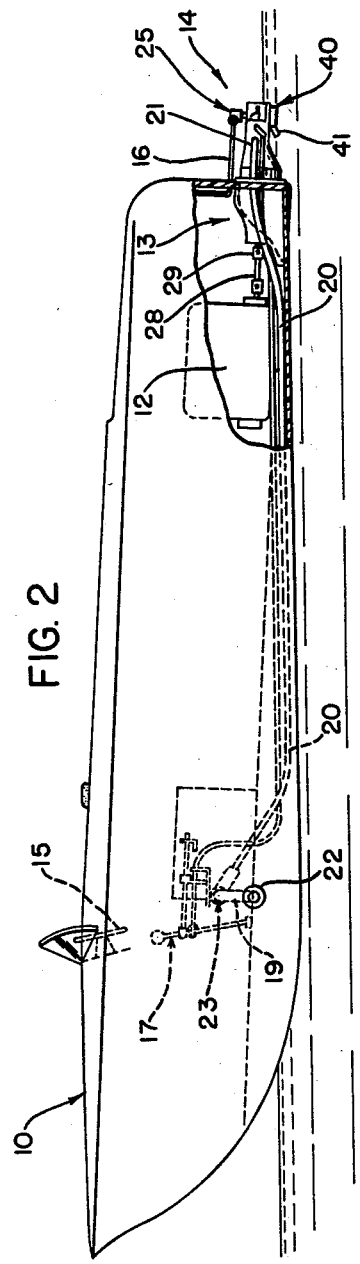
INVENTOR.
HENRY U. SPENCE
BY
*Fay & Fay*
ATTORNEYS May 25, 1965     H. U. SPENCE     3,185,124
STERN STEERING FOR HYDRAULIC JET BOAT
Filed July 17, 1961     7 Sheets-Sheet 2

*INVENTOR.*
HENRY U. SPENCE
BY
*Fay & Fay*
ATTORNEYS

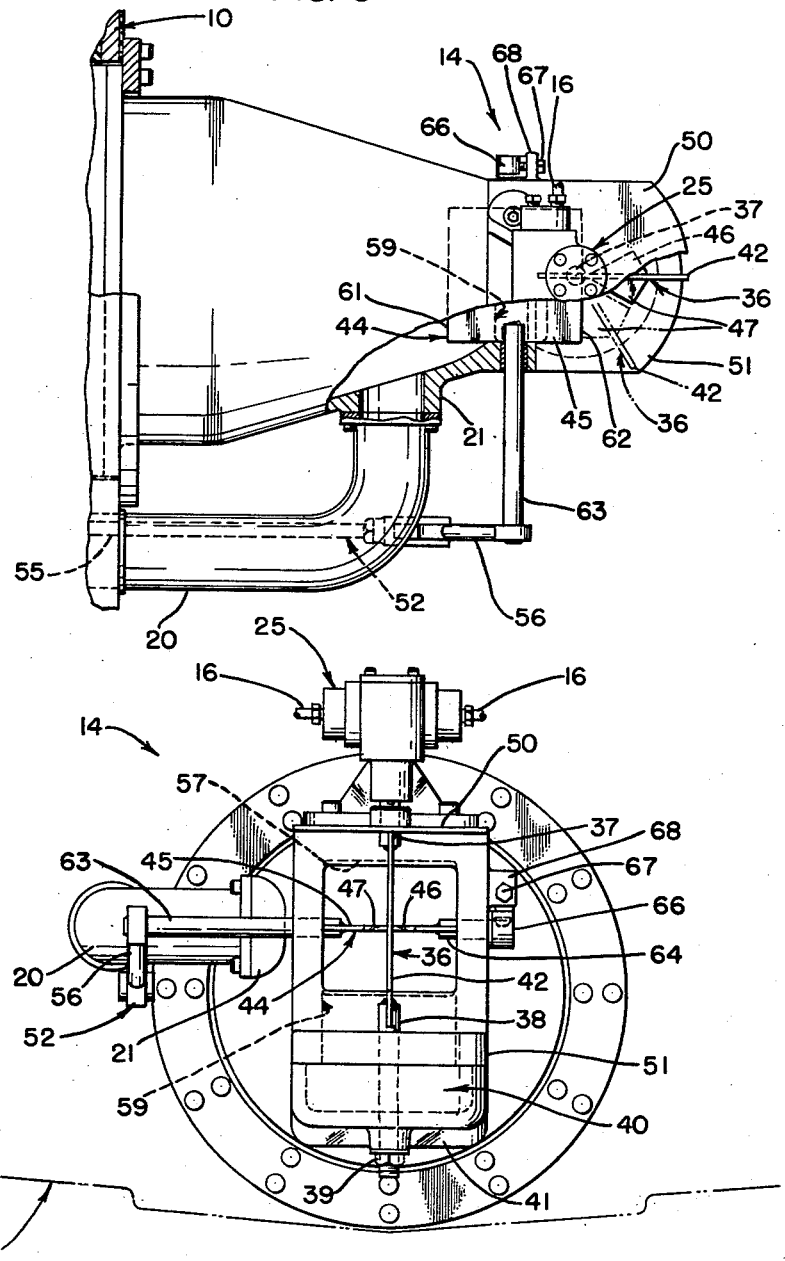

May 25, 1965   H. U. SPENCE   3,185,124
STERN STEERING FOR HYDRAULIC JET BOAT
Filed July 17, 1961   7 Sheets-Sheet 5

INVENTOR.
HENRY U. SPENCE
BY
*Fay & Fay*
ATTORNEYS

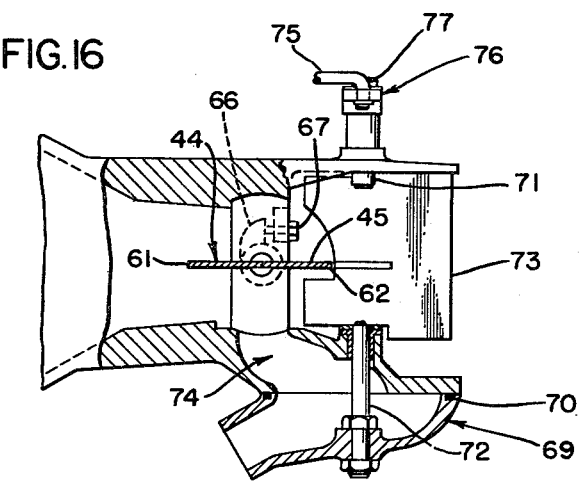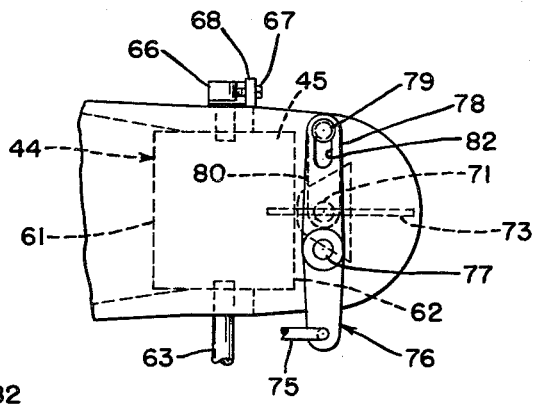

May 25, 1965  H. U. SPENCE  3,185,124
STERN STEERING FOR HYDRAULIC JET BOAT
Filed July 17, 1961  7 Sheets-Sheet 7

*INVENTOR.*
HENRY U. SPENCE
BY
*Fay & Fay*
ATTORNEYS

United States Patent Office 3,185,124
Patented May 25, 1965

3,185,124
STERN STEERING FOR HYDRAULIC JET BOAT
Henry U. Spence, 819 Eastwood Drive, Painesville, Ohio
Filed July 17, 1961, Ser. No. 124,414
9 Claims. (Cl. 115—12)

This invention relating as indicated to a stern steering device for hydraulic jet boats is particularly directed to the combination in a stern steering device together with a reversing nozzle for controlling and propelling a boat. The invention is further directed to a specific structure in a simplified jet turbine with a control means therefor including a rudder and reversing nozzle for taking a portion of the jet stream and reversing its direction to provide a reverse thrust for the jet boat.

An object of this invention is to integrate the controls for a jet turbine involving a rudder or rudders, shut-off valves and reversing nozzles in an improved simplified manner to provide better control of the jet stream of water.

A further object of this invention is to provide an improved simplified control for a jet turbine involving a rudder and shut-off valve together with the associated reversing nozzle structures therefor.

A further object of this invention is to integrate a rudder and a shut-off valve for a hydraulic jet turbine to provide an improved simplified control for the turbine.

A further object of this invention is to provide for a vertical rudder and a jet turbine shut-off valve substantially perpendicular thereto integrated in such a manner that a stream of water can be taken off and directed forward of the boat to provide a reversing nozzle.

To the accomplishment of the foregoing and related ends, said invention then consists of the means hereinafter fully described and particularly pointed out in the claims, the following description setting forth in detail one approved means of carrying out the principles of the invention, such disclosed means however constituting but one of the various ways in which the principles of the invention may be used.

In the drawings:

FIG. 1 is a schematic top plan view of a boat showing in the stern the jet turbine combination with parts broken away;

FIG. 2 is a cut-away side view of FIG. 1 showing the jet turbine boat, the engine, turbine and associated controls therefor;

FIG. 5 is a fragmentary top plan view of FIG. 3 showing the stern steering device and the bow steering take-off;

FIG. 6 is a rear view of the controls and stern steering;

FIG. 16 is a fragmentary view of a modified stern steering apparatus and a modified reversing nozzle structure;

FIG. 17 is a fragmentary top plan view of FIG. 16 showing a modified steering linkage for the rudder;

FIG. 18 is a rear view of the modified turbine steering apparatus showing the reverse nozzle and the steering linkage;

Generally, in connection with this invention, 10 shows a boat in standardized form having an open cock-pit 11, an engine 12 and the jet turbine shown generally at 13, and the control means therefor shown at 14. The boat would have the standard controls including a steering wheel 15 and its associated cable controls possibly hydraulic, though including also push-pull cables with arms and quadrants, for the control of the boat. These are shown schematically at 16. Some type of "joy stick" as shown at 17 will provide for controls either hydraulic or push-pull cable controls to the engine to activate the reversing nozzle and perhaps the bow steering. Conduits are shown at 18 to the starboard side (right) and 19 to port (left) side from a main conduit line 20 which is taken off the stern steering device at 21 and this may be incorporated in this "joy stick" control to provide bow steering fluid directed to either the port or starboard side or combinations of these in order to provide improved bow steering for the boat. This could be provided in some simplified "joy stick" control as is shown schematically at 17. Openings for the bow steering are shown at 22 and valve control means therefor will be seen generally at 23. The drawings further show the control means for the rudder and this may employ either hydraulic controls or a push-pull cable and a quadrant as is seen at 25. The cable therefor is further shown at 16 leading to the bow and the steering controls.

Figures 3, 4:
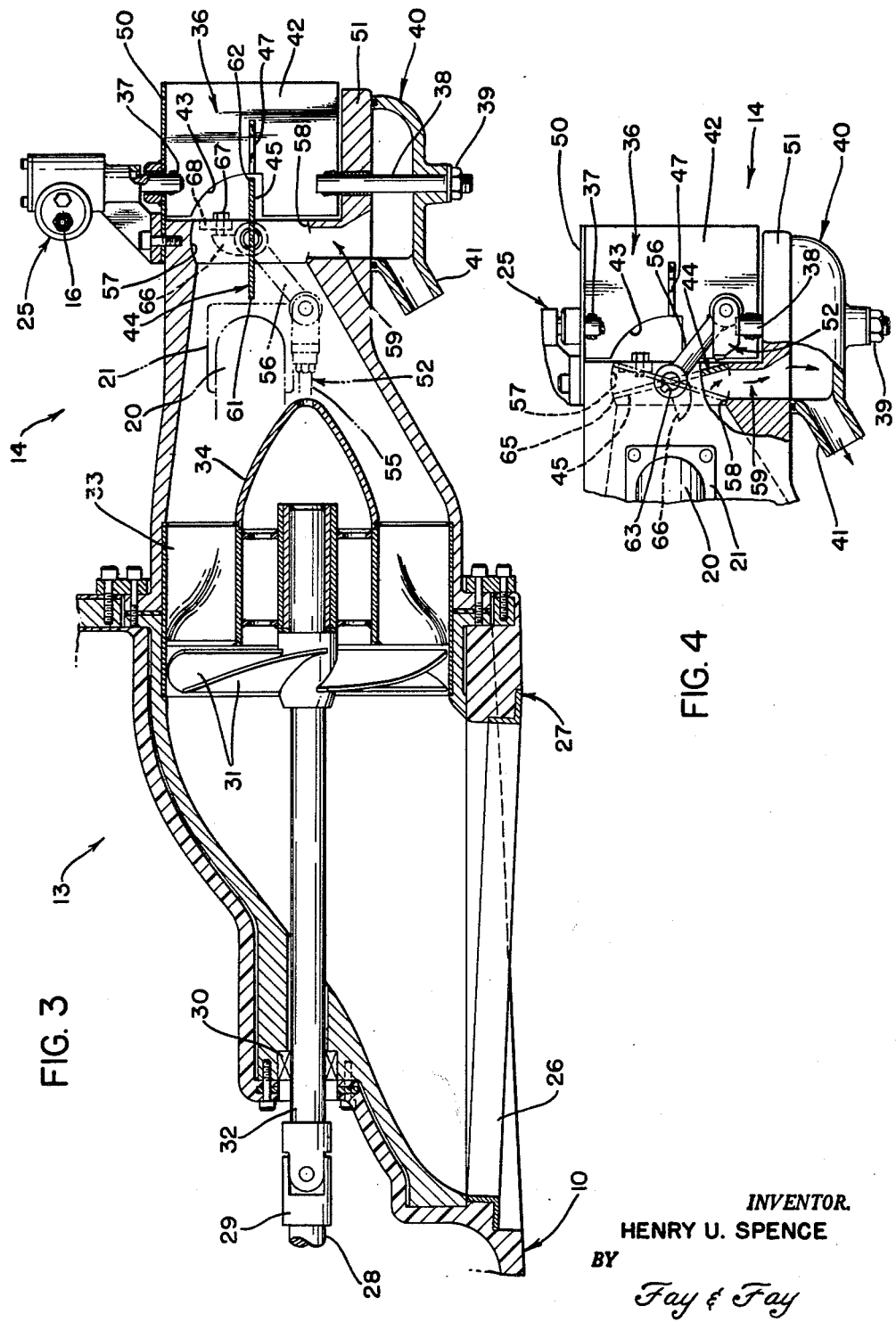
FIG. 3 is an enlarged cross-sectional view through the intake grill, single-stage turbine, stator blades, stern steering and reversing mechanism taken along line 3—3 of FIG. 1.
FIG. 4 is a fragmentary view of FIG. 3 showing the stern steering device and the shut-off valve in position for reverse thrust.

FIG. 3 shows cross-section of the jet turbine and the stern steering controls mentioned generally consisting of a series of grate bars 26 in a housing member shown generally at 27 having a power input as is seen at 28 connected to the engine through a coupling 29 and there would be a bearing with seals and packing as is seen at 30 into the turbine itself; the turbine blades of which are shown at 31, the shaft therefor 32 and the stator blades shown schematically at 33. This is a single-stage turbine in this instance.

The water will be taken in from the area adjacent to the keel through the grate bars shown at 26 and be forced by the turbine past the stator blades around the nose section 34 where it will converge in a nozzle section and pass through the directional controls which incorporate a rudder shown generally at 36 being secured as by welding to a vertical pivot member 37 and secured at the lower end by means of a further vertical pivot which is the extension of the upper pivot and this is shown at 38 and fastened by suitable means with a threaded fastener at 39 securing at the same time the reversing nozzle housing generally at 40, the nozzle section being shown at 41. The rudder blade itself 42 may be moved through a suitable arc to direct the stream of water from the boat. There will be a cut-out section in the shape of a quarter of a circle, as for example at 43, to permit the movement of the principal shut-off valve for the turbine shown generally at 44 and a portion of this in the full-open position is seen at 45 which would swing through an arc clockwise to form a cut-out portion of the rudder. The main shut-off valve is horizontally pivoted and is adapted to move through an arc of 105 degrees from a substantially horizontal position 75 degrees counterclockwise to a full-closed position and 25 to 30 degrees further counterclockwise as in seen in FIG. 4, to provide fluid into the reversing nozzle. The full-open position is shown in connection with FIG. 3, the reversing position is shown in FIG. 4.

Details of this will be described more completely in that control means which is indicated generally at 25 will operate the rudder pivot 37 and 38 in moving the rudder generally 36 and its blade portion 42 through the limited arc. This permits the rudder to be moved through a limited angular movement to steer and the pivot points may be adjusted by means of the push-pull cable attached to the actuating mechanism shown generally at 52. This would be pivoted in the turbine assembly generally. Further it will be seen that movement of the rudder assembly 36 and the rudder blade 42 generally will not interfere with the butterfly shut-off valve because of the cut-out section 43. This shut-off valve 44 pivoted about its horizontal axis or shaft is free to move through its arc somewhat larger than 90 degrees from the reverse position through the close position to the full-open position and still permit the rudder blade 42 to rotate through its arc from starboard to port.

Further, it will be seen that the reverse nozzle housing shown generally at 40 with the nozzle outlet projected downwardly and forwardly at 41 consisting of an angular cavity around the pivot point 38 so that when the valve 44, which is to be described in greater detail, goes into the reverse position, a flow of water under high pressure is directed downwardly through passage 59 into the reversing cavity and nozzle so that it projects forwardly and downwardly under the boat. It will be seen that at the same time, the turbine may then be directed into reverse and it will reverse along the identical path that the rudder is steering the boat, i.e., there will not be any side thrust from a quick-shift of the control valve on the turbine to the reverse position. If this were not the case, there might be an accidental movement into reverse, in which event, the boat would give a sharp thrust to starboard or port and upset the occupants.

Further, in connection with this assembly, the shut-off valve is particularly important. FIGS. 3 and 4 show two different positions. The actuating arm which would be actuated by a push-pull cable is shown at 55 and the arm for said axle is shown at 56. Arm 56 is keyed to split shaft 63, 64 similar to rudder shafts 37, 38. The shut-off valve 44 is in turn journaled to split shaft 63, 64 as by welding. Valve 44 has a full-open adjustable stop means shown with the stop lug 66, attached to shaft 64 which may abut an adjustable bolt 67 in the full-open position. This adjustment is important to minimize restrictions of flow. Bolt 67 is threaded through ear 68 that is integral with the stator housing.

The blade itself is shown at 44 and it has a number of positions fitting in a generally angular cavity formed by arcuate top walls 57 and arcuate bottom walls 58. In this bottom wall there would be a generally rectangular passage, perhaps in one size an inch and four inches across, which is designated generally at 59. The valve itself would be perhaps in one size four inches square and would permit the passage of roughly 16 sq. inches of water at anyone time. However, only about a quarter of this would be able to go down to passageway 59 to the reversing cavity 40 and nozzle 41.

The three positions of this are shown in FIGS. 3 and 4, and they are the full-open position, which is shown in FIG. 3 where the leading edge of the blade as at 61, the trailing edge of the blade as at 62 is in line with the flow of fluid through the turbine and provides the least resistance to the flow and permits the maximum flow therethrough. As this valve would be rotated from this position counterclockwise, the flow would be restricted and at the position which is shown in FIG. 4, the valve will be closed, i.e. no fluid may pass through the turbine. This means, that the turbine and its blade would develop pressure, some of which would be dissipated into the bow steering apparatus, which outlet is shown generally at 21 forward of the stern steering mechanism.

At the same time, from the fully closed position which would be in effect neutral since the forward motion of the boat would be arrested and it would be only going on momentum, if any, the nozzle might be rotated counterclockwise into an angle of somewhat less than 45 degrees to the position shown at 65, where the reversing nozzle is in a full-open position and water from the jet turbine passes through the nozzle downwardly under the pressure directed by the vane 44 into passageway 59 and into the enlarged reversing cavity 40 and out through nozzle 41. This provides a jet stream of water under the boat, partially lifting the boat and directing the boat to the rear. This is a simple way of providing reverse control for the boat, to retard the boat and to direct the boat rearwardly though at slower speed than forwardly, of course.

Further, it will be seen that this control nozzle can be partial or total and is dependent upon the speed of the turbine and other factors. It will also be seen that the rudder blade 44 of the control valve will generally be a fairly tight fit in the cavity and will prevent excessive loss of fluid around the edges of the blade.

It will further be obvious from a careful study of FIGS. 3 and 4 that the boat can go from full forward back through neutral to full reverse and will not interfere with the rudder and at the same time, will not cause any change in the operational characteristics of the engine and the turbine, i.e. it may go from full forward into reverse at full throttle. Of course, pressure would be building up in the engine at this time and this might not be the most desirable manner of operating the boat, but there is no absolute obstruction to movement of the main control valve in the manner indicated.

It further will be seen that this combination of components produces a very simplified design in which the stern steering is controlled in a minimum of longitudinal space, at the same time, providing a Venturi nozzle for improving speed, directing a stream of water out into the air in a controlled direction controlled by a very simple vertical rudder member which is compact and integrated carefully into a horizontally disposed shut-off valve which also serves as a simplified reversing valve and nozzle, the rudder and reversing nozzle being integrated in such a manner that the components produce a new result and control very accurately the flow of fluid through the turbine. This combination then provides a new and improved simplified design control and stern steering device together with associated reversing mechanism, and is controlled positively at all times under the direction of hydraulic and/or push-pull cables so that all actions are positive from some directed control. At the same time with the suitable location of the take-off valve for the bow steering in the Venturi orifice behind the turbine and stator blades, a substantial fluid pressure can be developed which may direct the bow steering devices and other means within the boat for control purposes and other power uses. This, however, does not affect the operation of the stern steering or the turbine. It will also be clearly seen that no fluid will pass down the reversing nozzle when the engine is operating under high pressure as there is no obstruction to the flow of fluid past the nozzle and fluid would have to pass at almost right angles to its direction of flow going through the turbine at quite high speed being developed by the turbine which can operate perhaps at 4,000 r.p.m. with a fluid flow of 88 ft./sec., which under certain conditions, may drive a boat upwards of 40 m.p.h.

It is only under conditions where a large pressure is developed, as it would in the case shown in FIG. 4, because the fluid is prevented from going out past the stern steering nozzle and because there is a fairly tight connection in the reversing valve, that the fluid may be forced downwardly and outwardly providing a thrust.

Figure 7:
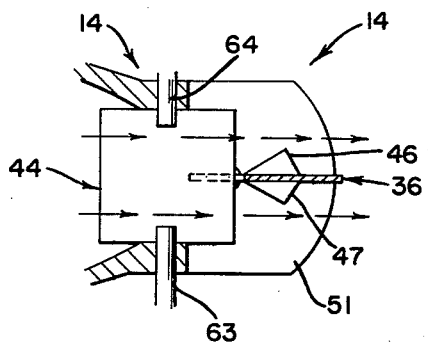
FIG. 7 is a schematic view of the flow through the main valve and past the rudder at full throttle.
Figure 8:
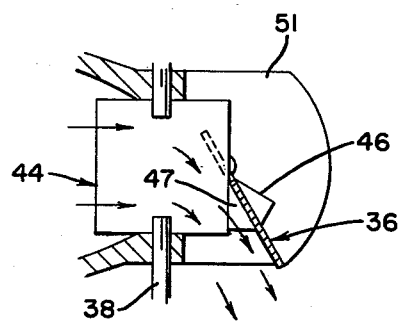
FIG. 8 is a further schematic view with the rudder turned to the maximum left rudder position.
Figure 9:
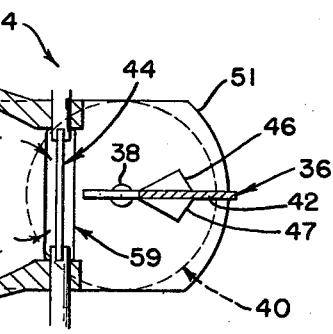
FIG. 9 is a view showing the water flow in reverse position.
Figure 10:
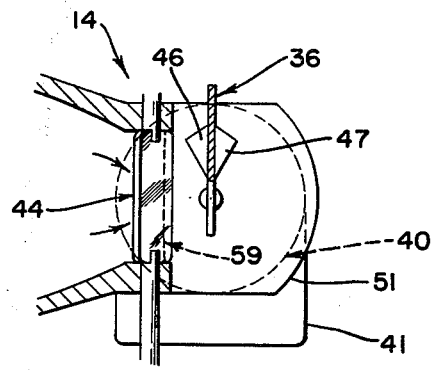
FIG. 10 is a view of the steering apparatus in reverse position with maximum right rudder.

In the operational figures, FIG. 7 et seq., the details of the flow through the turbine and past the main shut-off valve and the rudder are illustrated. FIG. 7 is a view at full throttle of the turbine past the main shut-off valve and past the rudder. FIG. 8 is a condition under which the fin 47 on the port side contacts the trailing edge of the main shut-off valve so that there is no danger of excessive turning which might tip the boat over. FIG. 9 illustrates a further condition where the main shut-off valve has been turned downward into the reversing nozzle section. In this position, the rudder is still directly astern. This figure is, properly speaking, an intermediate position on the way to the full reverse. FIG. 10 shows the difference in that the shut-off valve 44 can be slightly angled in this view and the rudder has been swung around to a hard-right position and it is further noted that the arms or extensions 46 on the starboard side in this position do not contact the main shut-off valve and the stream of water can go directly out through the reversing nozzle 41 so that a full 180 degree turning ability is present in reverse, though there is a lesser turning capacity at full throttle.

Figure 11:
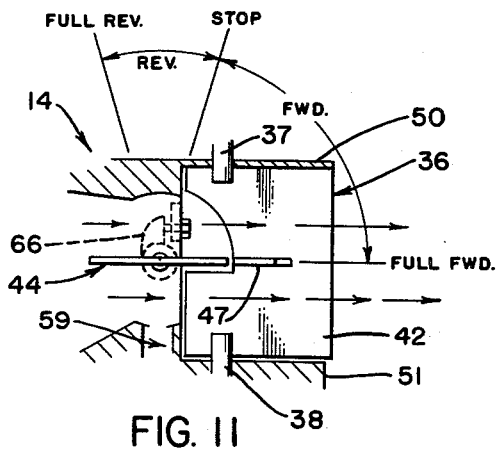
FIG. 11 is a schematic view showing the position of the main shut-off valve and the manner in which it would be moved to the various control positions.

The position of the main valve is shown graphically in connection with FIG. 11 and there are a series of diagrammatic arcs indicating the position of the valve as it turns from full reverse to stop and carrying on to full forward. The flow of water would be through the valve, past the rudder 36, but would be partially restricted.

Figure 12:
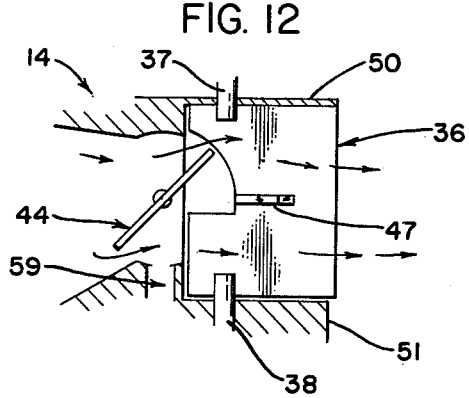
FIG. 12 is a further view of the main shut-off valve partially closed.
Figure 13:
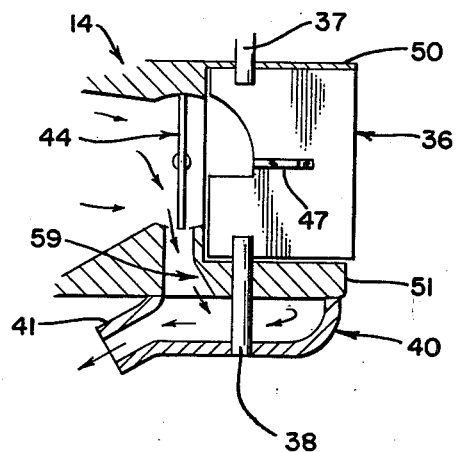
FIG. 13 shows the main shut-off valve passing through neutral to the reverse position.
Figure 14:
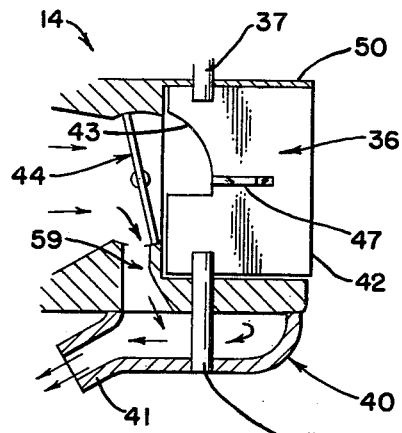
FIG. 14 shows the main shut-off valve in reverse position.
Figure 15:
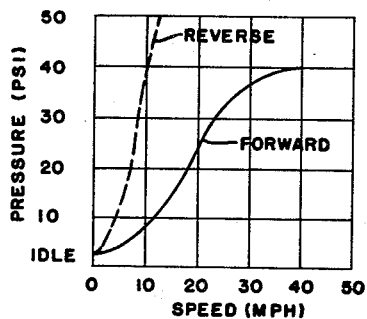
FIG. 15 is a schematic view of the relationship of pressure in the turbine and the speed.

This latter condition is illustrated in FIG. 12 and FIGS. 13 and 14 show the various positions that would be gone through as one goes from neutral or slightly past neutral, as in FIG. 13, to full reverse position as shown in FIG. 14. The graphical presentation of the pressure in the turbine and the forward speed is seen in FIG. 15 and there would be a larger pressure for reverse and the speed would, of course, be substantially reduced.

Figure 19:
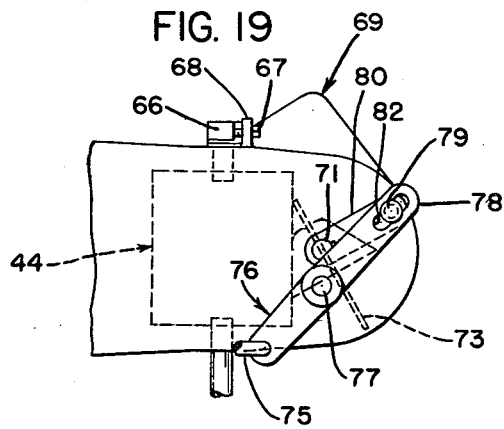
FIG. 19 is a further top plan view of the steering linkage in maximum left rudder.

FIGS. 16 et seq., show a modified form of the turbine in which a modified enlarged reversing nozle 69 is shown with the usual sealing means as is seen at 70, an O-ring structure, and it is pivoted by means of a split shaft 71, 72 to the main rudder 73. Further it will be seen that the reversing passageway 74 is slightly enlarged. FIG. 17 illustrates the top plan view of this modification and this shows the control linkage for the reversing nozzle and rudder which consists of an actuating arm 75, pivoted by means to a first link 76 which is pivoted offset from the main rudder 73 at post 77. The opposite end of said link is indicated at 78 with pivot 79 and a further link 80 is directly connected to the rudder post 71. Main link 76 has an elongated slide indicated at 82 into which pivot 79 may move under certain operational conditions seen in connection with FIGS. 18 and 19.

Figure 20:
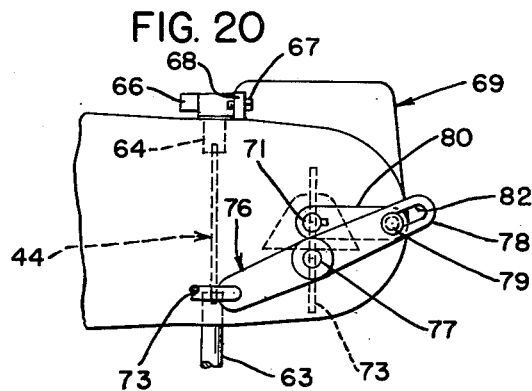
FIG. 20 is a further modified view of the steering linkage in reverse with maximum left rudder.

FIG. 20 shows a further position in which the linkage is moved to an extremely hard-left position.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a directional control means for a hydraulic jet turbine, a Venturi section having a main propulsion opening, a main shut-off valve in said Venturi section comprising a horizontally pivoted member closing said opening, a main rudder disposed in the path of said water through the Venturi, a reversing nozzle connected to said rudder, and having a nozzle opening forward therefrom, a passageway into said reversing nozzle from said Venturi section, sad valve being able to close the Venturi nozzle selectively either to stop flow of water through the Venturi section or to direct water into the reversing nozzle.

2. In a steering apparatus for a hydraulic jet turbine adapted to provide starboard and port steering to a main stream by means of a rudder and adapted to provide reversing means for said turbine as well as reverse steering which comprises a Venturi section for a hydraulic jet turbine, a main rudder immediately astern of said Venturi section, a main shut-off valve immediately forward of said rudder and having a horizontal axis adapted to close the opening in said Venturi, a reversing nozzle beneath said main valve and rudder and connected to said rudder, said reversing nozzle having a forwardly directed nozzle portion, a passageway from said Venturi to said nozzle, said main valve being adapted to move from a full-open position through a closed position to open a passageway into the reverse nozzle whereby full control may be maintained over the stream in steering using the rudder and said valve, and the amount of water through the Venturi may be controlled by the main shut-off valve and directional control in reverse may be achieved by directing water from the main valve into the reversing nozzle.

3. In a steering apparatus for a hydraulic jet turbine, a Venturi nozzle, a main valve in said Venturi nozzle adapted to close said nozzle, a rudder in the jet stream from said nozzle and substantially perpendicular to said main valve, side projections to either side of said rudder to limit the arcuate movement of said rudder when the main valve is in full-open position, said side projections contacting the main valve at the extremes of the arcuate travel of the rudder to prevent excessively rapid turning movements that might endanger the craft.

4. In a directional control means for a hydraulic jet turbine, a Venturi section having a Venturi nozzle, a main shut-off valve in said Venturi section comprising a horizontally pivoted member closing said opening, a main rudder disposed in the path of said water through the Venturi, a reversing nozzle connected to said rudder, and having a nozzle opening forward therefrom, a passageway into said reversing nozzle from said Venturi section, said valve being able to close the Venturi nozzle to direct water into the reversing nozzle, a cut-out portion in the leading edge of said rudder and in which a portion of said main shut-off valve may intersect when moving into the full-open position whereby the physical positioning of said valve and rudder may be made closely adjacent one another with planar surfaces substantially perpendicular to one another without interfering with their operation.

5. In a steering apparatus for a hydraulic jet turbine adapted to provide starboard and port steering to a main stream by means of a rudder and further being adapted to provide a reversing means for said turbine as well as reverse steering which comprises a Venturi section for a hydraulic jet turbine, said Venturi section having an opening therein, a main rudder immediately astern of said opening in said Venturi section, a main shut-off valve immediately forward of said rudder and having a horizontal axis adapted to close the opening in said Venturi section, a reversing nozzle beneath said main valve and rudder and connected to said rudder, said reversing nozzle having a forwardly directed nozzle portion, a passageway from said Venturi section to said nozzle, said main valve being adapted to move from a full-open position through a closed position to open a passageway into the reverse nozzle whereby full control may be maintained over the stream in steering using the rudder and said valve, and the amount of water through the Venturi may be controlled by the main shut-off valve and directional control in reverse may be achieved by directing water from the main valve into the reversing nozzle, the axis of the rudder and the axis of the main valve are perpendicular to one another and closely adjacent to each other and there is a quadrant cut-out in the rudder to permit the main valve to move into the plane of the rudder without interfering with its operational control in order to provide better control of the jet stream.

6. In a steering apparatus for a hydraulic jet turbine adapted to provide starboard and port steering to a main stream by means of a rudder and adapted to provide reversing means for said turbine as well as reverse steering which comprises a Venturi section for a hydraulic jet turbine, having an opening, a main rudder immediately astern of said Venturi section, control means for said rudder, a main valve immediately forward of said rudder and being rotatable about a horizontal axis to control flow through said opening, a reversing nozzle beneath said main valve and rudder and connected to said rudder, said reversing nozzle having a forwardly directed nozzle portion, a passageway from said Venturi to said nozzle, said main valve being adapted to move from a full-open position through a closed position to open a passageway into the reverse nozzle whereby full control may be maintained over the stream in steering using the rudder and control means, and the amount of water through the Venturi may be controlled by the main shut-off valve and directional control in reverse may be achieved by means of directing water from the main valve into the reversing nozzle.

7. The steering apparatus of claim 6, in which the axis of the rudder and the axis of the main valve are perpendicular to one another, said rudder and main valve being positioned closely adjacent to each other in the flow path through the Venturi section.

8. In a watercraft having a jet stream for propulsion, a Venturi section having a nozzle, rudder means rotatable about a vertical axis adjacent said nozzle, valve means adjacent said rudder adapted to control flow through said nozzle by movement to forward, neutral, and reverse positions, said valve in the forward full open position having a portion thereof received in a cutaway portion of said rudder, reversing nozzle means positioned below said rudder and being connected thereto so that when said rudder is in a fore and aft position said reversing nozzle is pointing forwardly of said watercraft, opening means in said Venturi section in communication with said reversing nozzle means and aft of said valve when said valve is in neutral position.

9. In a water craft having a jet stream for propulsion, a Venturi section having a nozzle, rudder means rotatable about a vertical axis adjacent said nozzle, valve means adjacent said rudder adapted to control flow through said nozzle, said valve in the full open position having a portion thereof received in a cutaway portion of said rudder, reversing nozzle means positioned below said rudder and being connected thereto so that when said rudder is in a fore and aft position, said reversing nozzle is pointing forwardly of said watercraft, opening means in said Venturi section forwardly of said valve and being in communication with said reversing nozzle means, and limit means on said rudder cooperating with a portion of said main valve when said main valve is in the open position to limit the rotary movement thereof, said main valve being ineffective to limit the movement of said rudder in a position other than full open.

References Cited by the Examiner
UNITED STATES PATENTS

| | | | |
|---|---|---|---|
| 2,024,274 | 12/35 | Campini | 115—14 |
| 2,328,041 | 8/43 | Weilons | 114—166 |
| 2,857,119 | 10/58 | Morguloff | 244—52 |
| 3,102,389 | 9/63 | Pedersen et al. | 115—12 X |

FOREIGN PATENTS

| | | |
|---|---|---|
| 188,683 | 8/06 | Germany. |

FERGUS S. MIDDLETON, *Primary Examiner.*

MILTON BUCHLER, *Examiner.*